United States Patent [19]

Sukegawa et al.

[11] Patent Number: 5,778,429
[45] Date of Patent: Jul. 7, 1998

[54] PARALLEL PROCESSOR SYSTEM INCLUDING A CACHE MEMORY SUBSYSTEM THAT HAS INDEPENDENTLY ADDRESSABLE LOCAL AND REMOTE DATA AREAS

[75] Inventors: Naonobu Sukegawa; Tshiaki Tarui, both of Kokubunji; Hiroaki Fujii; Hideya Akashi, both of Hadano, all of Japan

[73] Assignee: Hitachi, Ltd., Tokyo, Japan

[21] Appl. No.: 497,751

[22] Filed: Jul. 3, 1995

[30] Foreign Application Priority Data

Jul. 4, 1994 [JP] Japan ................ 6-174768

[51] Int. Cl.$^6$ ................ G06F 12/00
[52] U.S. Cl. ................ 711/129; 711/153; 711/118; 395/800.01
[58] Field of Search ................ 395/800, 448, 395/456, 472, 473, 468, 469, 470, 800.01; 364/DIG. 1; 711/121, 129, 145, 196, 141, 142, 143, 153, 118

[56] References Cited

U.S. PATENT DOCUMENTS

| 4,142,234 | 2/1979 | Bean et al. ................ 364/DIG. 1 |
| 4,755,930 | 7/1988 | Wilson, Jr. et al. ................ 364/DIG. 1 |
| 5,025,365 | 6/1991 | Mathur et al. ................ 364/DIG. 1 |
| 5,303,362 | 4/1994 | Butts, Jr. et al. ................ 395/448 |
| 5,313,609 | 5/1994 | Baylor et al. . |
| 5,434,986 | 7/1995 | Kuslak et al. ................ 395/392 |
| 5,577,204 | 11/1996 | Brewer et al. ................ 395/200.01 |

OTHER PUBLICATIONS

Green et al., "A highly flexible multiprocessor solution for ray tracing", *The Visual Computer*, pp. 62-73, 1990.
D. Lenoski et al, "The Standord Dash Multiprocessor," IEEE Mar. 1992, pp. 63-79.
Singh et al, "Parallel Visualization Algorithms:Performance and Architectural Implications", IEEE, Jul. 1994, pp. 45-55.

*Primary Examiner*—Alyssa H. Bowler
*Assistant Examiner*—Walter D. Davis, Jr.
*Attorney, Agent, or Firm*—Fay, Sharpe, Beall, Fagan, Minnich & McKee

[57] ABSTRACT

A parallel processor system controls access to a distributed shared memory and to plural cache memories to prevent frequently-used local data from being flushed out of a cache memory. The parallel processor system includes a plurality of nodes each including a processor and a shared memory in a distributed shared memory arrangement, and a local-remote divided cache memory system, wherein local data and remote data are controlled separately. Each local-remote divided cache memory system includes a local data area, a remote data area, and a cache memory controller by which either the local data area or the remote data area is accessed according to the contents of an access request.

40 Claims, 8 Drawing Sheets

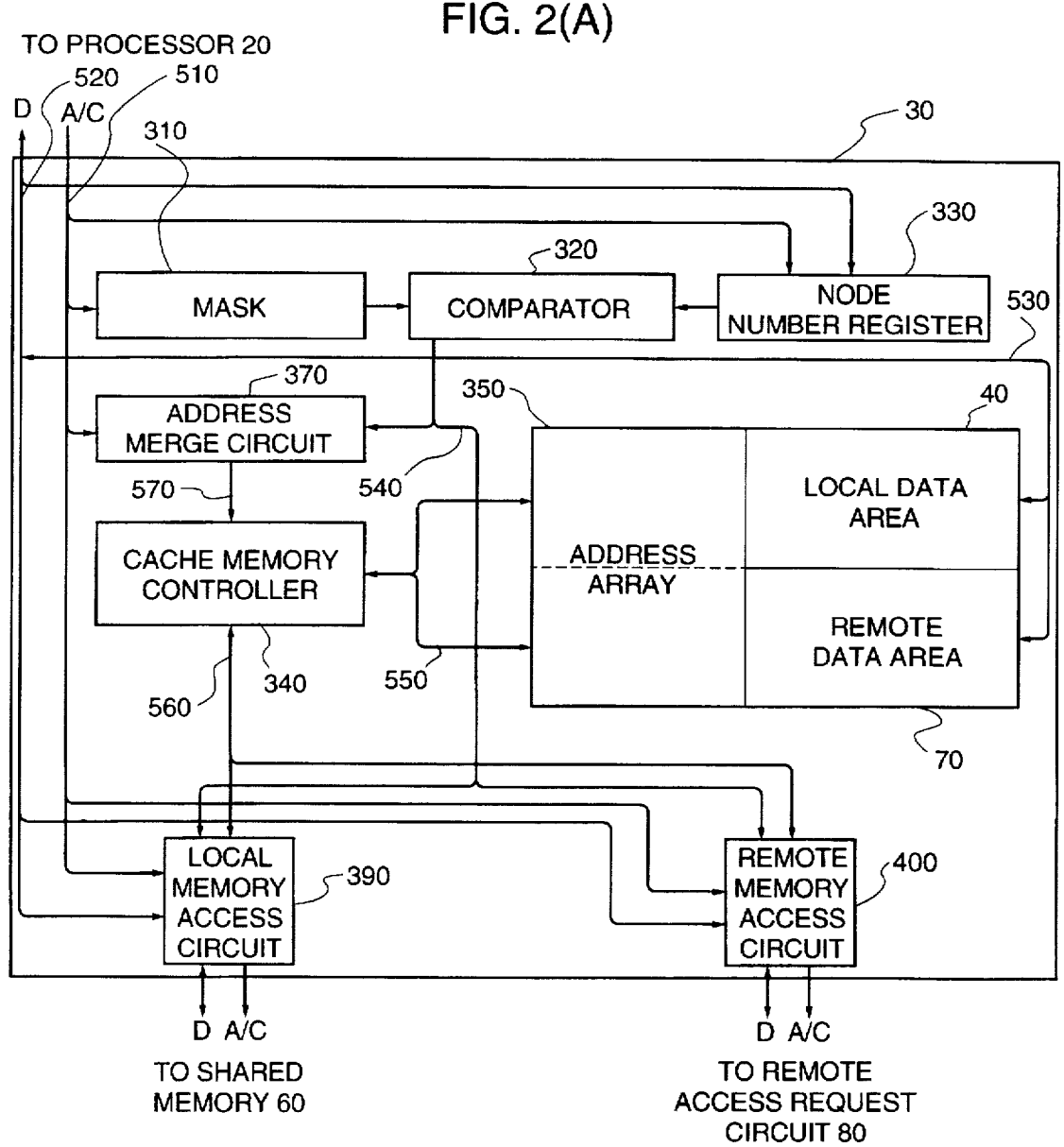

FIG. 9
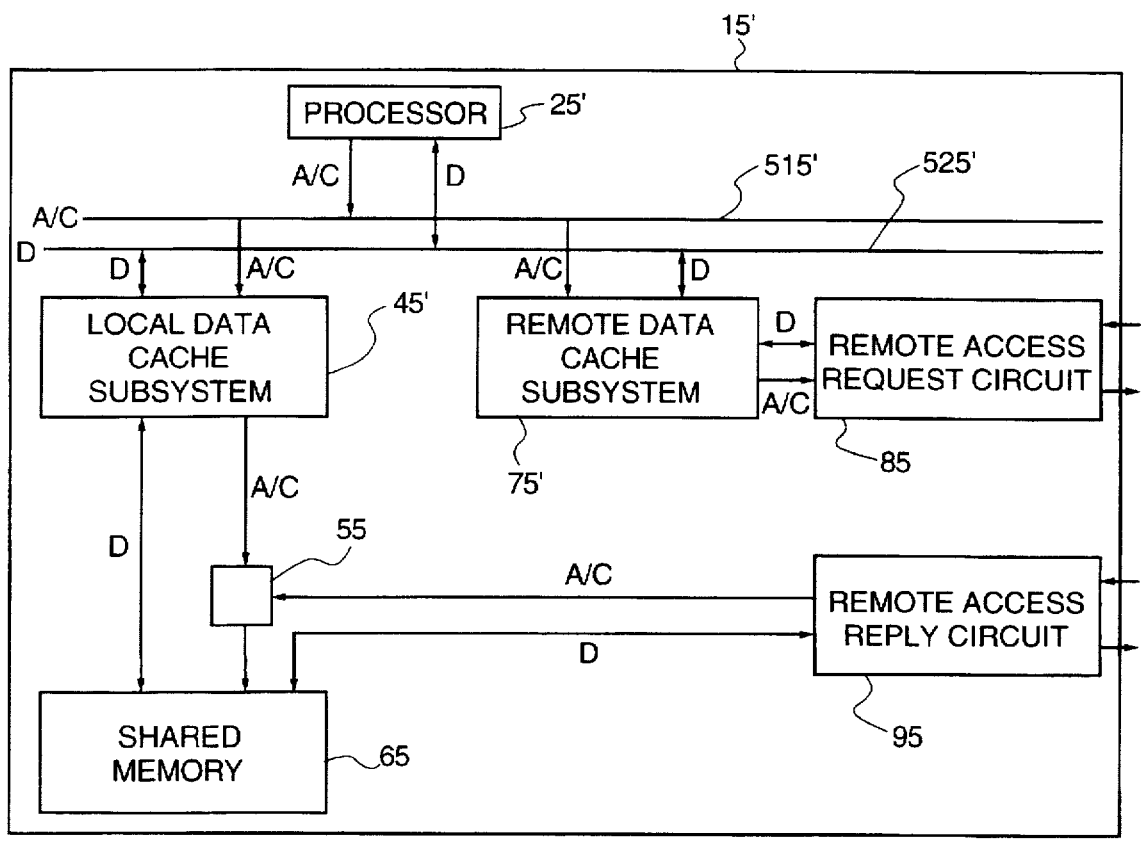
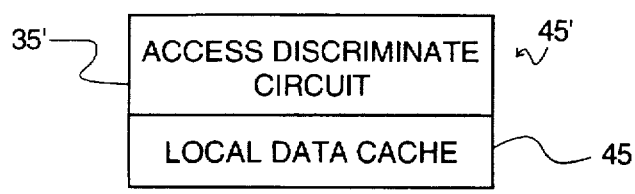
FIG. 10
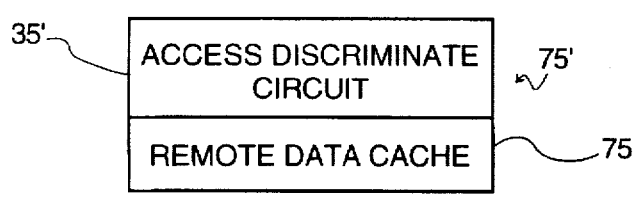
FIG. 11

PARALLEL PROCESSOR SYSTEM INCLUDING A CACHE MEMORY SUBSYSTEM THAT HAS INDEPENDENTLY ADDRESSABLE LOCAL AND REMOTE DATA AREAS

BACKGROUND OF THE INVENTION

1. Field of the Invention

The present invention relates to a parallel processor system having a plurality of cache memories and a shared memory, and more particularly to such a parallel processor system in which the shared memory is constituted by plural distributed shared memories.

2. Description of the Related Art

Increasingly, improvements in parallel processor technology are focusing on communication among the processors to improve computer performance. Two primary communication means are the message passing method, in which processors exchange messages via a network, and the shared memory method, in which each processor accesses a shared memory.

Processors employing the message passing method generally exchange messages by starting an operating system. However, starting the operating system constitutes a large overhead, especially for communicating short messages.

In the shared memory method, on the other hand, communication may take place without starting the operating system. Therefore, the shared memory method alleviates this burden on communication.

A distributed shared memory method, which divides and distributes the shared memory, has proven to be an effective method for large-scale parallel processor systems. Distributing the shared memory allows simultaneous access to the shared memory by a plurality of processors, realizing a high level of parallel processing. An example of a distributed shared memory, in which nodes comprising a processor and a part of the shared memory are interconnected by a network, is disclosed in Japan Patent Laid-Open No. 89056/1993.

In this distributed shared memory method, when processors access the shared memory, data are transferred with high probability through the network. However, compared to the fast processing speed of the processors, the network speed is slow. Hence, the delay time through the network poses a problem for overall access speed.

A technique for speeding the access to a shared memory over a network provides a cache memory at each node. The cache memory is typically a small-capacity, high-speed buffer for registering the contents of part of the shared memory. Examples of distributed shared memories that use cache memory include Baylor et al, U.S. Pat. No. 5,313,609, and Lenoski et al, "The Stanford Multiprocessor," *Computer* (March 1992), pp. 63–79.

These distributed shared memories that use cache memory are particularly characterized in that data in the shared memory in the same node (local data) and data in the shared memory in other nodes (remote data) are recorded in the same cache memory.

The distributed shared memory system divides large-scale array data and distributes them among the shared memory in each node. In array computations, each processor uses local data and remote data and performs calculations in parallel. The amount of remote data used in the array computation is generally enormous. Thus, when the large-scale array computation is performed by the distributed shared memory system that has the cache memory, the remote data used for the calculation cannot be fully accommodated in the cache memory, and are flushed out.

The local data includes, aside from the array data, those data which, though limited in quantity, are used the most often, such as a variety of system variables used by the operating system. Such data are desirably registered in the cache memory at all times to optimize overall system performance.

As stated above, remote data may be flushed from the cache memory when the capacity of the cache memory is insufficient for handling large-scale array computations. Similarly, the local data that is most frequently used may also be flushed out during large-scale array calculations due to the cache overflow resulting from accessing data at remote nodes. Loss of these frequently-used local data degrades the system performance.

SUMMARY OF THE INVENTION

The present invention solves this problem by controlling access to the distributed shared memory and to the plural cache memories to prevent frequently-used local data from being flushed out of a cache memory, which would otherwise occur due to cache overflow with remote data according to the systems described above.

The present invention includes, in a parallel processor system, a plurality of nodes each including a processor and a shared memory in a distributed shared memory arrangement, and a local-remote divided cache memory system, wherein local data and remote data are controlled separately. Each local-remote divided cache memory system includes a local data area, a remote data area, and a cache memory controller by which either the local data area or the remote data area is accessed according to the contents of an access request. Other constituent parts of the parallel processor system constructed according to the teachings of the present invention will be described in greater detail below.

BRIEF DESCRIPTION OF THE DRAWINGS

FIG. 2A is a block diagram showing details of the local-remote divided cache memory subsystem o FIG. 1;

FIG. 9 illustrates another configuration of a parallel processor system according to the present invention;

FIG. 10 shows a local data cache memory subsystem according to the embodiment shown in FIG. 9; and FIG. 11 shows a remote data cache memory subsystem according to the embodiment shown in FIG. 9.

DETAILED DESCRIPTION OF THE PREFERRED EMBODIMENTS

Figure 1:
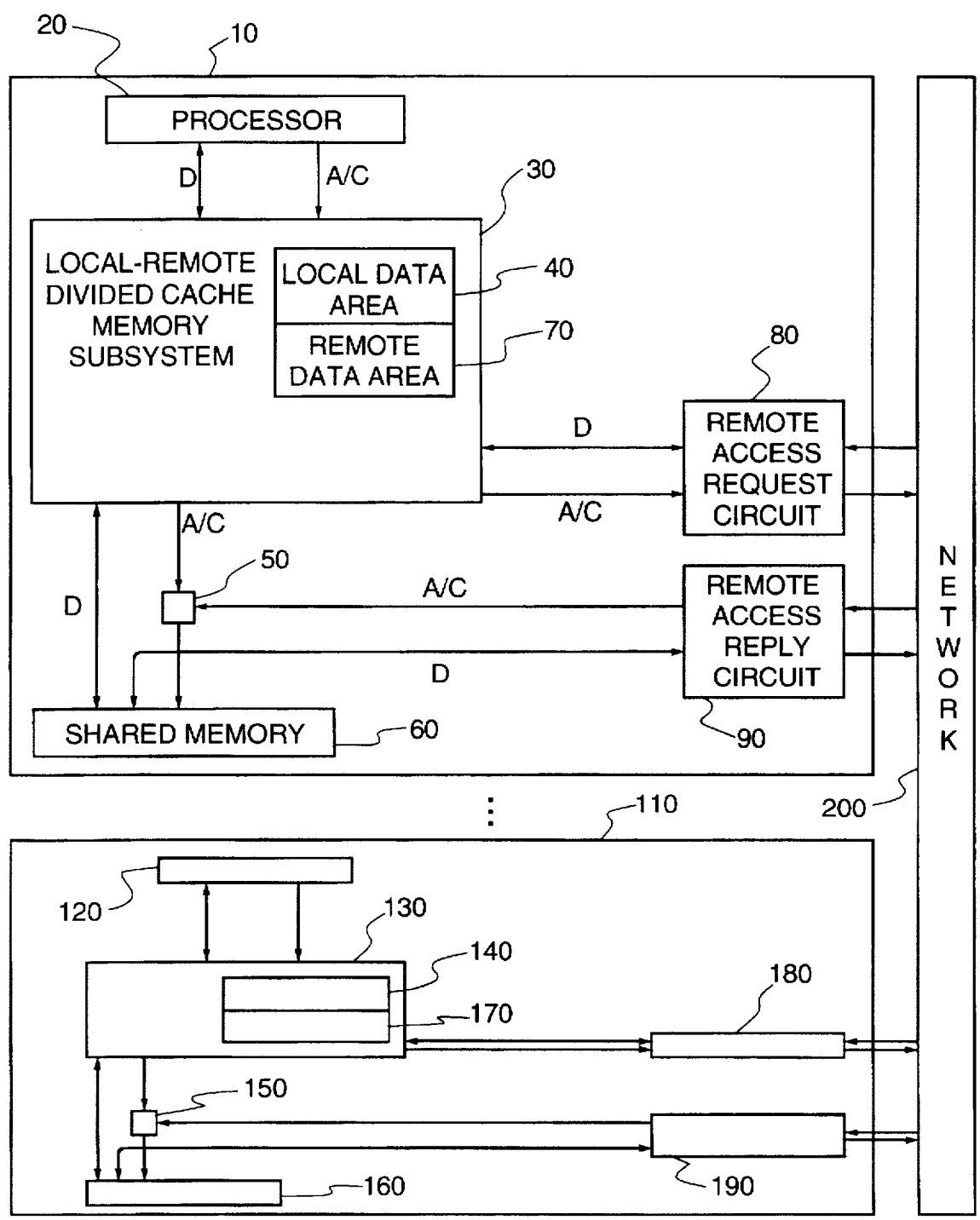
FIG. 1 is a block diagram showing a configuration of a parallel processor system constructed according to the teachings of the present invention, including a local-remote divided cache memory subsystem.

The parallel processor system of FIG. 1 includes a plurality of nodes 10, 110, . . . , and a network 200 that joins them. For the purposes of this description, each node is considered to have the same components, although variations that do not deviate from the basic teachings of the invention may be made.

Each node 10, 100 has a processor 20, 120 and a shared memory 60, 160 connected to the network 200 via remote access request circuit 80, 180 and remote access reply circuit 90, 190, respectively. The processor 20, 120 is connected to its shared memory 60, 160 via a local-remote divided cache memory subsystem 30, 130, which contains a local data area 40, 140 separately from a remote data area 70, 170. As the names suggest, local data area 40, 140 stores local data, and remote data area 70, 170 stores remote data. Access to the local data area 40, 140 is controlled separately from access to the remote data area 70, 170.

FIG. 2A shows a preferred embodiment of the local-remote divided cache memory subsystem 30 of node 10. As noted above, the components of the other nodes, such as node 110, are desirably the same as those of node 10.

A data signal entering the local-remote divided cache memory subsystem 30 on data line 520 is directed to a node number register 330, a local memory access circuit 390, and a remote memory access circuit 400. As described more fully below, the data signal contains local node number information which, in combination with a mask 310, and a comparator 320, is used to determine whether the local memory access circuit 390 or the remote memory access circuit 400 is to be activated. If the data are to be transmitted to or from the local memory, then the local memory access circuit 390 communicates directly with the shared memory 60; however, if the data are to be transferred to or from a remote memory, then the remote memory access circuit 400 is activated to connect to a remote access request circuit 80, as shown in FIG. 1.

The local-remote divided cache memory subsystem 30 decides whether the local or a remote memory is to be accessed. An address control signal enters the local-remote divided cache memory subsystem 30 on address line 510, and is sent to the node number register 330, mask 310, an address merge circuit 370, local memory access 390, and remote memory access 400. A comparator 320 receives outputs from the mask 310 and from the node number register 330, from which it decides whether local or remote access is required. The decision is output on local-remote decision line 540 to the address merge circuit 370, and to either the local memory access 390 or the remote memory access 400. The signal received by the local memory access 390 or the remote memory access 400 is an activation signal that determines a source or destination of the data on data line 520.

If the signal on decision line 540 indicates that local memory access is required, the cache controller 340 is controlled by the merged address on line 570 to access local data area 40 in the divided cache memory via an address array 350. If remote data are concerned, then the cache controller 340 accesses the remote data area 70 via the address array 350 and the cache control signal line 550.

In the event that the accessed data area of the divided cache does not contain the data sought (i.e., if the data are not registered in the accessed data area), the cache controller 340 issues a memory access request signal on line 560 to the local memory access circuit 390 or the remote memory access circuit 400, depending on whether local or remote data are concerned.

Figure 2B:
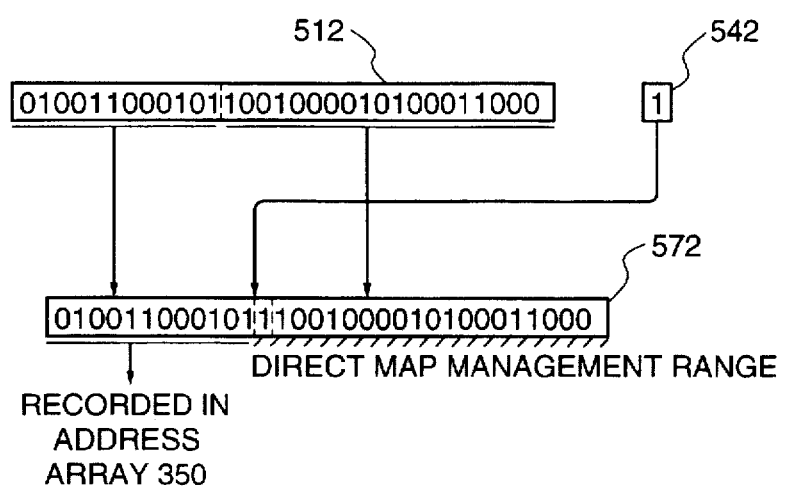
FIG. 2B illustrates a method of merging addresses as performed by the address merge circuit contained in the embodiment shown in FIG. 1.

FIG. 2B illustrates the preferred address merge process performed by the address merge circuit 370. Assuming a 1-megabyte direct-map cache memory addressed by 31 bits, the system illustratively assigns 19 lower-order bits for the address sought in the address array 350, and 12 higher-order bits as the address of the data area (local or remote) containing the requested data. The address merge circuit 370 embeds a single bit between the 19 lower-order and the 12 higher-order bits as a flag indicating whether the local data area 40 or the remote data area 70 is to be addressed.

An example of accessing the local data area 40 is shown in FIG. 2B. The embedded bit is a 1 bit, and as shown is embedded between the 12 higher-order bits and the 19 lower-order bits. The 32-bit merged address thus generated is output on the merged address line 570 to the cache controller 340, which then puts the merged address 572 onto the cache memory control signal line 550 to the address array 350.

Since the embedded bit is a logic 1, the lower-order 20 bits (including the embedded bit) of the merged address 572 represents the location sought in the address array 350. If, as a result of the search, the system determines that the requested data is not registered in the local-remote divided data cache memory constituted by the local data area 40 and the remote data area 70, the cache memory controller 340 is notified via the cache memory control signal line 550.

Then, the cache memory controller 340 issues a load request for memory to the local memory access circuit 390 and the remote memory access circuit 400 through a memory access request signal line 560. Whichever one of the local memory access circuit 390 and the remote memory access circuit 400 has been activated by the signal on the local-remote decision signal line 540 outputs the load request address received via the address signal line 510. If the local-remote decision signal line 540 contains the bit indicating that local memory is to be accessed, a signal output from the activated local memory access circuit 390 is sent to the shared memory 60 through a selector 50. However, if the signal on the local-remote decision signal line 540 indicates that remote memory is to be accessed, then the remote memory access circuit 400 outputs the load request address to the remote access request circuit 80. Each of the scenarios will be discussed in turn.

In the former example, the shared memory 60 returns reply data for the load request to the local memory access circuit 390. The reply data are sent to the processor 20 via the data line 520. At the same time, the cache memory controller 340 outputs a request to register the reply data to the address array 350 via the cache memory control signal line 550.

When the address array 350 receives the registration request, it erases part of the data in the local data area 40 (i.e., one of the entries in the local data area 40 is erased), newly registers the reply data sent via the data line 530 in the local data area 40, and updates information in the address array 350 reflecting the registration. In this way, the loading of local data that are not registered in the local data area 40 corresponding to the higher-order 512 kilobytes of cache memory does not affect the remote data area 70 that corresponds to the lower-order 512 kilobytes of cache memory.

Figure 3:
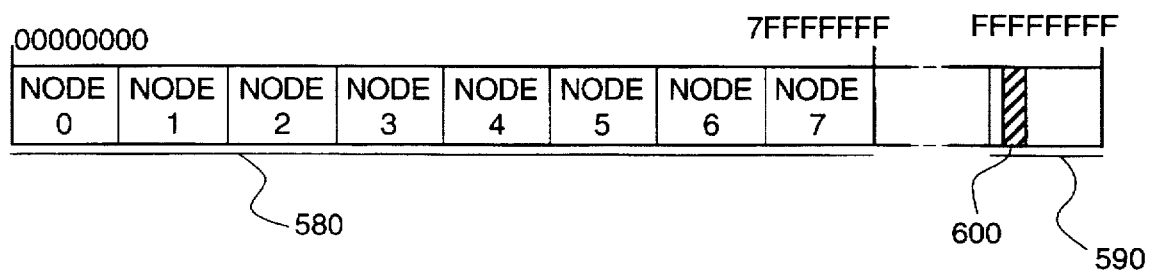
FIG. 3 describes the address space employed according to the teachings of the invention.

FIG. 3 illustrates an example of the address space employed by the invention. As shown, eight nodes, each having 256 megabytes of shared memory, are interconnected by a network. In this example, each processor that employs the distributed shared memory system can access the shared memory of any node from two gigabytes of area 580 having an address in the range 00000000 to 7FFFFFFF. The address space contains an I/O access area 590 in a higher order region, in which exists an address 600 for accessing the node number register 330. The node number register 330, as shown in FIG. 2A, illustratively resides in the local-remote divided cache memory subsystem 30, 130 and stores the local node number.

Figure 4:
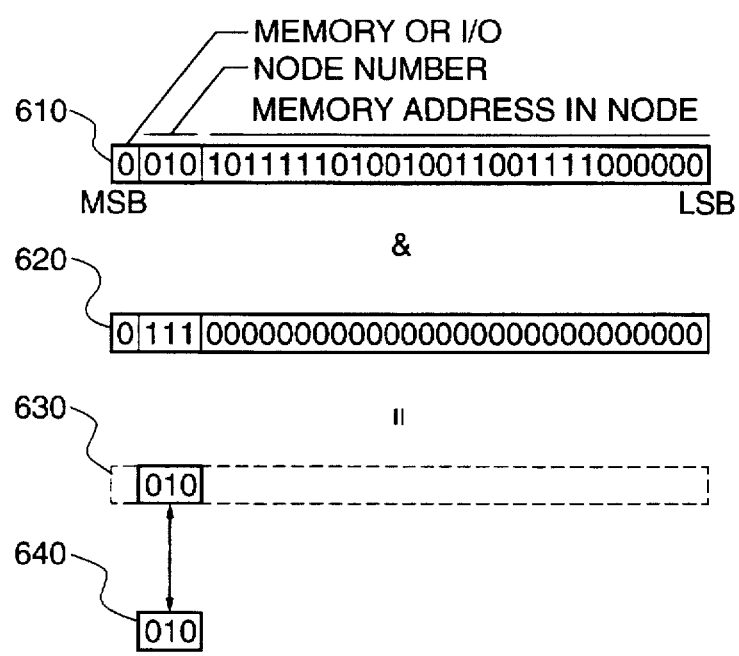
FIG. 4 illustrates a method of determining a local data access according to the teachings of the invention.

FIG. 4 illustrates more particularly the properties of different blocks of address bits. The most significant bit is used to determine whether the access is a memory access or an I/O access, and the following three bits represent the node number of the access destination if the access request is for memory access. Thus, a logical conjunction of the load request address 610 and the information 620 stored in the mask 310 (FIG. 2A) is used to derive the node number 630. The node number 630 is compared with information 640 contained in the node number register 330 by the comparator 320. When the numbers agree, the load request is recognized as a request for local data access. When the numbers do not agree, the system recognizes the load request as being for remote data access.

Figure 5:
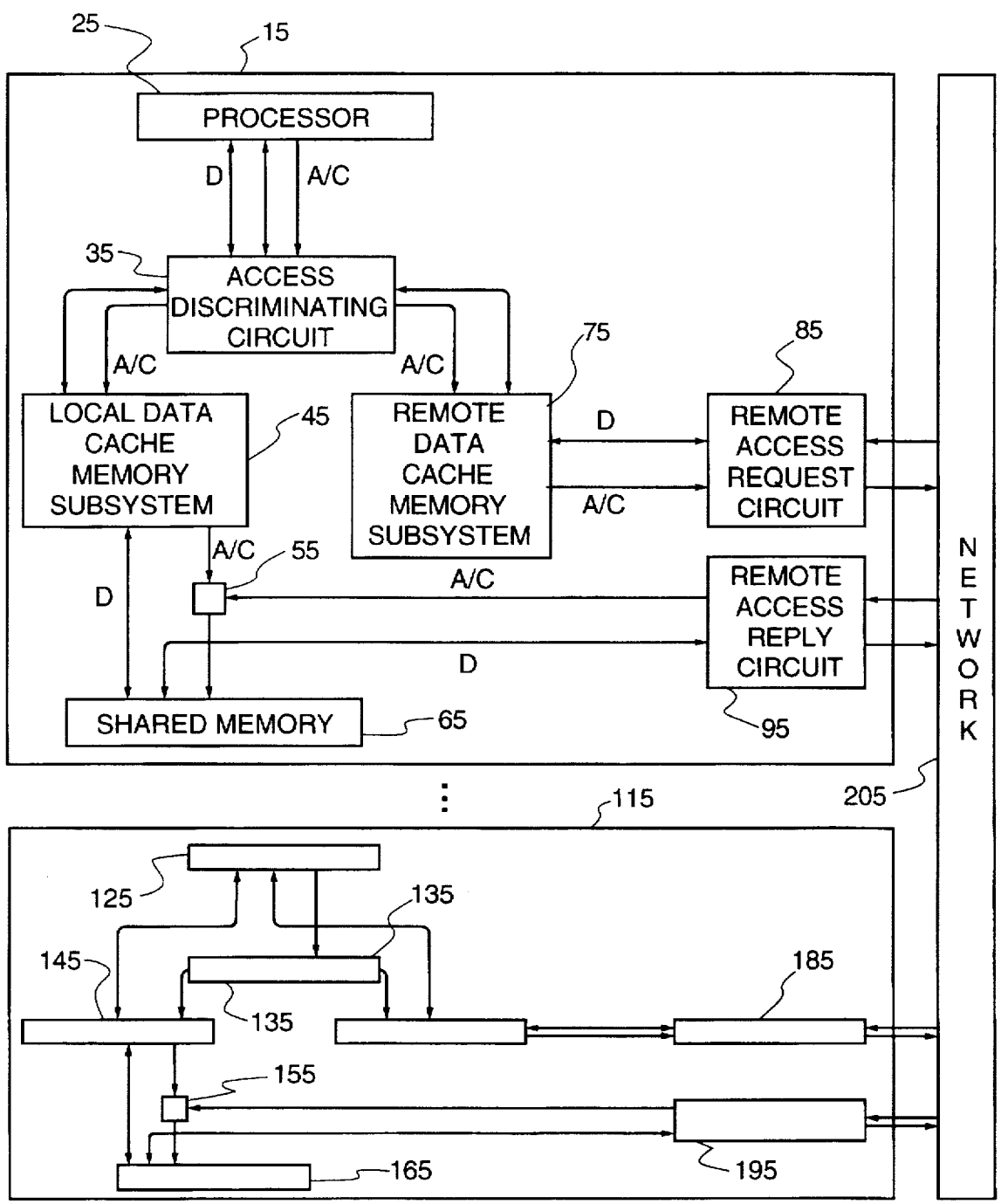
FIG. 5 is a block diagram of another embodiment of a parallel processor system according to the present invention, wherein local and remote data cache memory subsystems are separately employed.

Another embodiment of the present invention is shown in FIG. 5. FIG. 5 illustrates a plural processor system that utilizes a distributed shared memory system in conjunction with separate local and remote data cache memory subsystems that are independently addressable but do not form part of the same memory as in the embodiment disclosed above.

In the instant embodiment, a plurality of nodes 15, 115, . . ., are connected through a network 205 much as the nodes of the embodiment discussed above are connected. Again, only node 15 will be described, although it is assumed that each node will be similarly constituted to the end of operating similarly to achieve the objectives of the invention.

Thus, each node 15, 115 has a processor 25, 125, a shared memory 65, 165, a local data cache memory subsystem 45, 145, and a remote data cache memory subsystem 75, 175. Illustratively, the network 205 joins a total of eight nodes having such a configuration.

Figure 6:
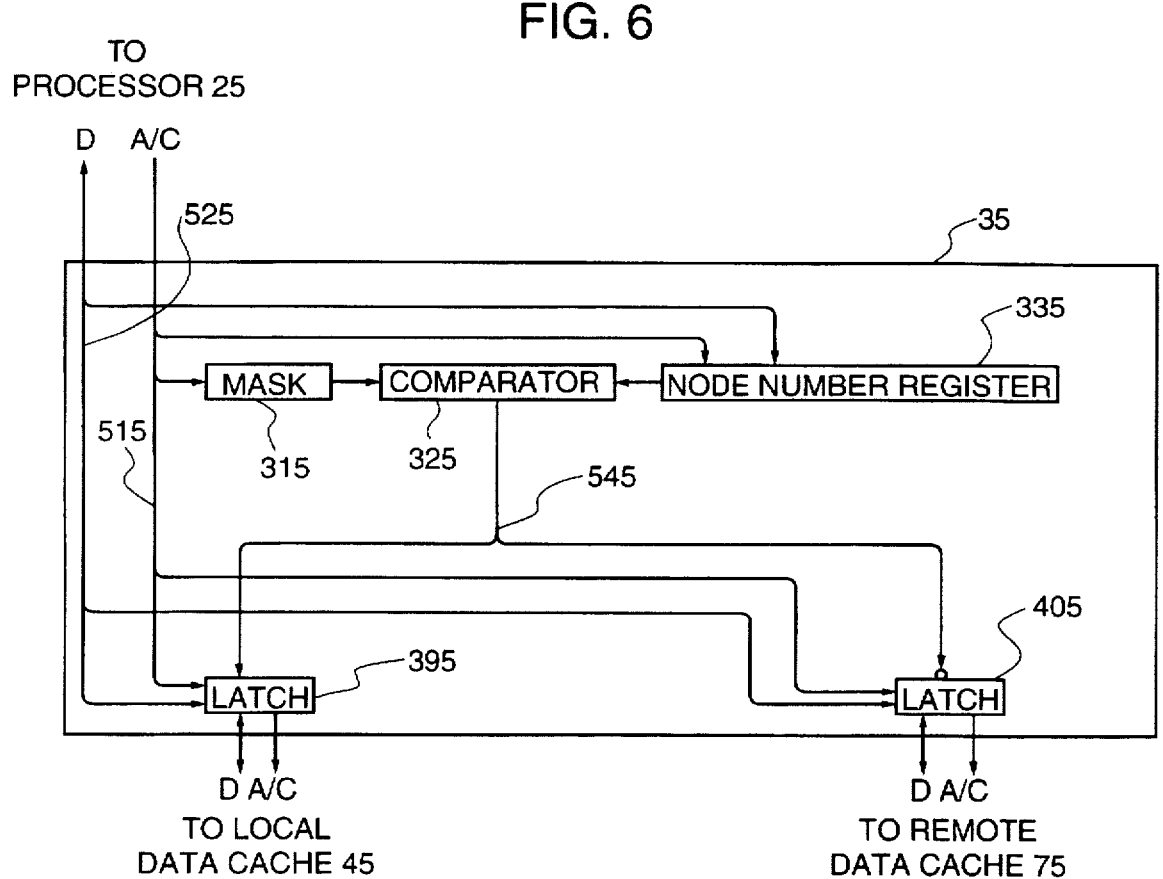
FIG. 6 is a block diagram of an access discriminating circuit employed by the embodiment shown in FIG. 5.

FIG. 6 explains in more detail the functional operation of the access discriminate circuit 35, 135, which includes a node number register 335 for storing a local node number, much as the node number register 330 stores a local node number in the previous embodiment.

When a data signal is received on data line 525 by the access discriminate circuit 35, the data signal is sent to the node number register 335, and to local data latch 395 and remote data latch 405. Broadly, latches 395 and 405 operate similarly to the local and remote memory access circuits 390 and 400 of the previous embodiment shown in FIG. 2A in that, when activated, the respective latch 395 or 405 transfers data to or from a location external to the access discriminate circuit 35. However, because the local and remote data cache memory subsystems are separately disposed in this embodiment, latches 395 and 405 are respectively connected to local data cache 45 and remote data cache 75 to selectively permit data transfer from one of the cache memory subsystems.

The node number originally set by data obtained from data line 525 is compared with the same three address bits, illustratively, contained in the address received on address line 515, employing a mask 315, comparator 325 and the node number register 335 in a similar manner as in the previous embodiment. However, according to the present embodiment, the result of the comparison is output on remote-local decision signal line 545 directly to local latch 395 and remote latch 405 to selectively activate one or the other (note that latch 405 illustratively inverts the remote-local decision signal at an input). If the local latch 395 is activated (i.e., if the remote-local decision signal indicates that local data access is necessary), then data are transferred to or from local data cache memory subsystem 45. If remote latch 405 receives the activated signal, then data are transferred to or from remote data cache memory subsystem 75.

Figure 7:
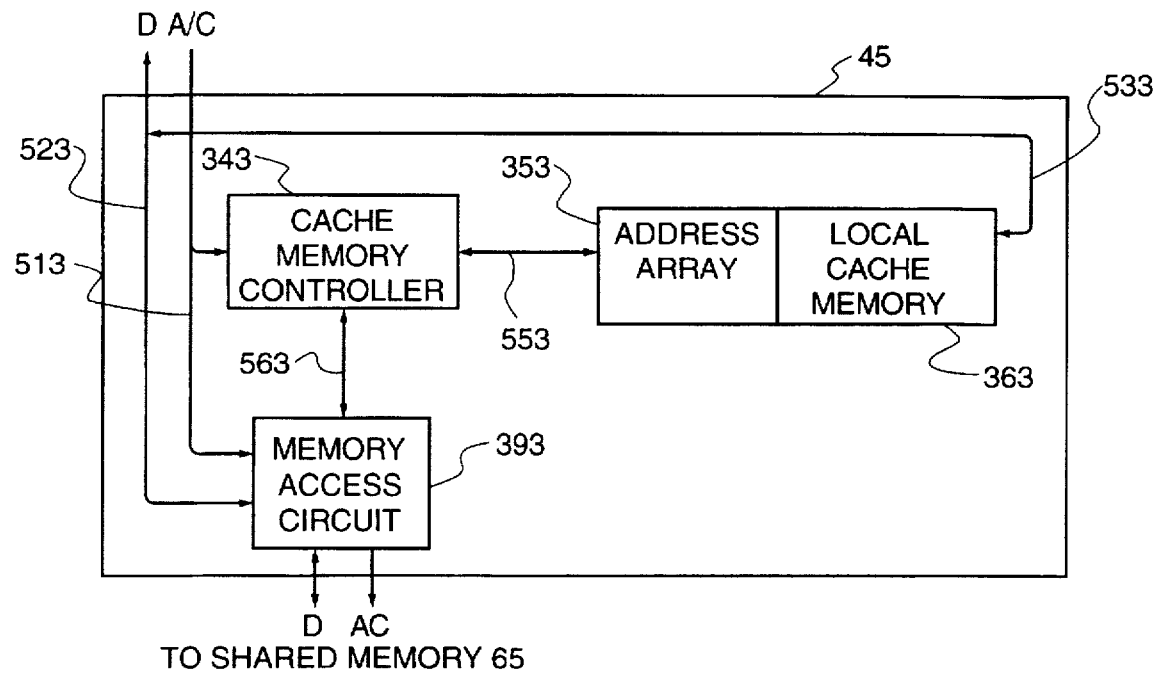
FIG. 7 is a block diagram of a local data cache memory subsystem that may be employed in the embodiment shown in FIG. 5.

FIG. 7 shows an example of the operation of local data cache 45. Local data cache memory subsystem 45 preferably includes a cache memory controller 343, address array 353, local cache memory 363, and memory access circuit 393 by which the shared memory 65 is accessed if the data required by the access request are not stored in the local cache memory 363. Thus, similarly to the previous embodiment, an address is received on address line 513 by the cache memory controller 343, which outputs a cache memory control signal on line 553 to address array 353. The address array 353 provides the location in local cache memory 363 that is sought by the address signal. If the data are found not to be registered in cache memory 363, a signal is returned to the cache memory controller 343 along cache memory control signal 553, and a memory access request signal is output on line 563 to the memory access circuit 393, which in turn accesses the shared memory 65. In a preferred embodiment, cache memory controller 343, address array 353, and memory access circuit 393, along with their interconnecting lines, are provided on a single chip.

Figure 8:
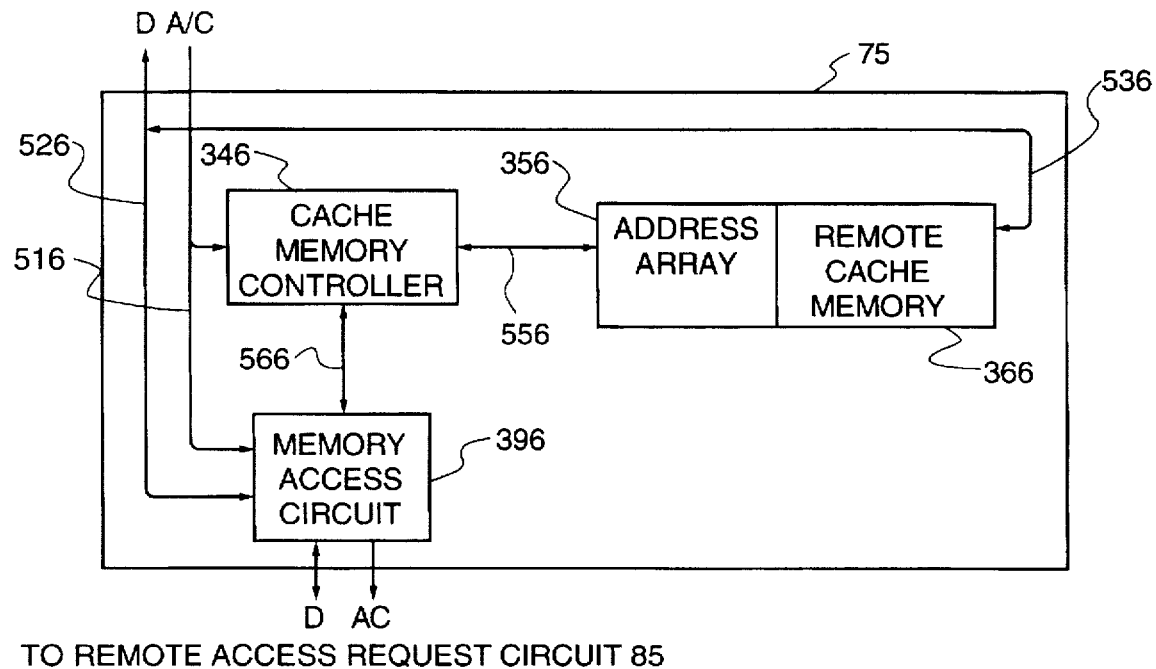
FIG. 8 is a block diagram illustrating a remote data cache memory subsystem that may be employed in the embodiment shown in FIG. 5.

FIG. 8 illustrates an example of the operation of a remote data cache memory subsystem 75. The operation is similar to that of FIG. 7, except that the address received on line 516 is routed by cache memory controller 346 to address array 356 along cache memory control signal line 556, to selectively access a location in remote cache memory 366. If the data are not registered in remote cache memory 366, a signal is returned to the cache memory controller 346, which outputs a signal to remote memory access circuit 396 along remote memory access request signal line 566, so as to access shared memory 85.

FIG. 9 shows another embodiment of the invention that is functionally similar to the functional diagram of FIG. 5, but which can use a noncustomized, currently-available processor which has only one data pin.

In the embodiment shown in FIG. 9, node 15' contains processor 25', which is connected to address line 515 and data line 525 by a single wiring line each. In turn, local data cache subsystem 45' and remote data cache subsystem 75' are each connected to the address and data lines, for transferring data between the processor and the shared memory 65 and between the processor and a remote node, respectively. The respective connections between the local data cache subsystem 45' and the shared memory 65, and between the remote data cache subsystem 75' and a remote node (via a network, not shown), are the same as shown in FIG. 5.

However, because the processor 25' has a single data pin, the instant embodiment incorporates an access discriminate circuit 35 into each of the local data cache subsystem 45' and remote data cache subsystem 75'. See FIGS. 10 and 11, respectively. The access discriminate circuits 35 and each of the cache subsystems can be the same as that shown in FIG. 6, discussed above, except that only one latch is necessary in each access discriminate circuit 35'. In other words, each of the access discriminate circuits 35' determines, from the input address and data, whether to activate its latch. If local data are to be accessed, then the latch permitting transfer to or from the local data cache 45' is activated. If remote data are to be accessed, then the latch permitting transfer to or from the remote data cache 75' is activated.

To further illustrate the operation of a parallel processor system constructed according to the teachings disclosed above, the following examples are proposed.

EXAMPLE 1

For the system embodiments shown in FIGS. 1 and 2A, when the processor 20 loads local data present in its node 10, the following cases are considered.

(1-1)

In this example, the local data to be loaded are not registered in the local data area 40 in the local-remote divided cache memory 30.

When a load request is output from the processor 20 to the local-remote divided cache memory subsystem 30 shown in FIG. 2A, the local-remote divided cache memory subsystem 30 checks the load request address to determine whether the request is for local data or remote data. This decision is made in accordance with the operations of the mask 310, comparator 320, and node number register 330.

With further reference to FIG. 4, the load request address 610 and the mask information 620 are logically ANDed to derive a node number 630 from the load request address 610. The node number 630 derived from the address is compared with the node number information 640 stored in the node number register 330, using the comparator 320. In this example, local data are to be loaded, so the two node numbers agree, and the system recognizes the request as being for local data access.

Thus, the comparator 320 outputs a logic 1 to the address merge circuit 370 via the local-remote decision signal line 540, and at the same time activates the local memory access circuit 390. The load request is also input by the address merge circuit 370 and the local memory access circuit 390 via the address signal line 510.

In the address merge circuit 370, the logic 1 bit output on line 540 is embedded at bit position 20 in the merged address 572, as shown in FIG. 2B. The merged address is output on line 570 to the cache controller 340, which places the merged address 572 onto the cache control signal line 550 to the address array 350.

Because the embedded bit is a logic 1, the addressed range is 80000-FFFFF in hexadecimal, defining the address range corresponding to the memory locations in local data area 40. In other words, the higher-order 512 kilobytes of the 1-megabyte direct map cache memory are assigned to the local data area 40, while the lower-order 512 kilobytes are assigned to the remote data area 70.

Since in this example, the requested data are not registered in the local data area 40, the cache memory controller 340 is notified via the cache memory control signal line 550, and outputs a load request for memory to the local memory access circuit 390 via the memory access request signal line 560. The remote memory access 400 also receives the request, but since only the local memory access circuit 390 is activated by the local-remote decision bit on line 540, no action is taken by the remote memory access circuit 400.

Instead, the local memory access circuit 390 outputs the load request address presented on the address signal line 510 to the shared memory 60 via the selector 50. See FIG. 1. Then, the shared memory 60 returns the reply data corresponding to the load request to the local memory access circuit 390, which relays the reply data to the processor 20 on the data line 520. At the same time, the cache controller 340 outputs a request for registering the reply data to the address array 350 through the cache memory control signal line 550.

Upon receipt of the registration request, the address array 350 erases data in the corresponding part of local data area 40 (i.e., erases one of the entries in the local data area 40), newly registers the reply data sent via the data line 530 in the local data area 40, and updates the address array 350. In this way, the loading of local data that was not previously registered in the local data area 40 corresponding to the higher-order 512 kilobytes of cache memory does not affect the remote data area 70 corresponding to the lower-order 512 kilobytes of cache memory.

(1-2)

In this example, the local data to be loaded are registered in the local data area 40 in the local-remote divided cache memory 30.

When a load request is output from the processor 20 to the local-remote divided cache memory subsystem 30 shown in FIG. 2A, the local-remote divided cache memory subsystem 30 checks the load request address to determine whether the request is for local data or remote data. This decision is made in the same manner as for example (1-1) above.

When the comparator 320 outputs a logic 1 to the address merge circuit 370 via the local-remote decision signal line 540 (indicating that the request concerns local data), it also activates the local memory access circuit 390. As before, the load request is also input by the address merge circuit 370 and the local memory access circuit 390 via the address signal line 510.

In the address merge circuit 370, the logic 1 bit output on line 540 is again embedded at bit position 20 in the merged address 572, as shown in FIG. 2B. The merged address is output on line 570 to the cache controller 340, which places the merged address 572 onto the cache control signal line 550 to the address array 350. Because the embedded bit is a logic 1, the address is defined in the address range corresponding to the memory locations in local data area 40. Thus, the cache memory controller 340 searches through the address array 350 corresponding to those memory locations.

Since in this example, the requested data are registered in the local data area 40, the cache memory controller 340 is notified via the cache memory control signal line 550, and the registered data are transferred to the processor 20 through the data lines 530, 520. In this way, the loading of the local data registered in the local data area 40 does not affect the remote data area 70.

EXAMPLE 2

For the system embodiments shown in FIGS. 1 and 2A, when the processor 20 stores local data present in its node 10, the following cases are considered.

(2-1)

In this example, the local data to be stored are not registered in the local data area 40 in the local-remote divided cache memory 30.

When a store request is output from the processor 20 to the local-remote divided cache memory subsystem 30 shown in FIG. 2A, the local-remote divided cache memory subsystem 30 checks the store request address to determine whether the request concerns local data or remote data. As for example (1-1), this decision is made in accordance with the operations of the mask 310, comparator 320, and node number register 330.

When the comparator 320 outputs a logic 1 to the address merge circuit 370 via the local-remote decision signal line 540, it also activates the local memory access circuit 390. The store request is also input by the address merge circuit 370 and the local memory access circuit 390 via the address signal line 510.

The merged address 572 is formed as described above, and is output on line 570 to the cache controller 340, which places the merged address 572 onto the cache control signal line 550 to the address array 350. Because the embedded bit is a logic 1, the address is defined in the address range corresponding to the memory locations in local data area 40. Thus, the cache memory controller 340 searches through the address array 350 corresponding to those memory locations.

Since in this example, the requested data are not registered in the local data area 40, the cache memory controller 340 is notified via the cache memory control signal line 550, and outputs a store request for memory to the local memory access circuit 390 via the memory access request signal line 560. The remote memory access 400 also receives the request, but since only the local memory access circuit 390 is activated by the local-remote decision bit on line 540, no action is taken by the remote memory access circuit 400.

Instead, the local memory access circuit 390 outputs the store request address presented on the address signal line 510, along with the data received on line 520, to the shared memory 60 via the selector 50, as described above with respect to Example (1-1). However, instead of returning the data for storage in the cache memory, the data are stored in the shared memory 60. In this way, the storing of local data that were not previously registered in the local data area 40 does not affect the remote data area 70.

(2-2)

In this example, the local data to be stored are registered in the local data area 40 in the local-remote divided cache memory 30.

When a store request is output from the processor 20 to the local-remote divided cache memory subsystem 30 shown in FIG. 2A, the local-remote divided cache memory subsystem 30 checks the store request address to determine whether the request concerns local data or remote data. This decision is made in the same manner as for example (1-1) above.

When the comparator 320 outputs a logic 1 to the address merge circuit 370 via the local-remote decision signal line 540 (indicating that the request concerns local data), it also activates the local memory access circuit 390. As before, the store request is also input by the address merge circuit 370 and the local memory access circuit 390 via the address signal line 510.

The merged address 572 is again formed in the address merge circuit 370 and output on line 570 to the cache controller 340, which places the merged address 572 onto the cache control signal line 550 to the address array 350. Because the embedded bit is a logic 1, the address is defined in the address range corresponding to the memory locations in local data area 40. Thus, the cache memory controller 340 searches through the address array 350 corresponding to those memory locations.

Since in this example, the requested data are registered in the local data area 40, the cache memory controller 340 is notified via the cache memory control signal line 550. The cache memory controller 340 then issues a request for eliminating registration of the store-requested data to the address array 350. In response to the request, the address array 350 deletes the registration information on the stored data from the local data area 40.

Further, the cache memory controller 340 sends a store request for memory to the local memory access circuit 390 and the remote memory access circuit 400 through the memory access request signal line 560. The remote memory access circuit 400 is not activated, but the local memory access circuit 390 outputs the store request address presented on the address signal line 510 and the store data presented on line 520 to the shared memory 60 via selector 50. The shared memory 60 updates data according to the request. In this way, the storing of the local data registered in the local data area 40 does not affect the remote data area 70.

EXAMPLE 3

For the system embodiments shown in FIGS. 1 and 2A, when the processor 20 loads remote data present in another node, the following cases are considered.

(3-1)

In this example, the remote data to be loaded are not registered in the remote data area 70 in the local-remote divided cache memory 30.

When a load request is output from the processor 20 to the local-remote divided cache memory subsystem 30 shown in FIG. 2A, the local-remote divided cache memory subsystem 30 checks the load request address to determine whether the request is for local data or remote data. This decision is made in accordance with the operations of the mask 310, comparator 320, and node number register 330.

However, unlike the previous Example (1-1), the comparison of node numbers 630 and 640 respectively derived from the address and the node number register 330 yields a false result. In this example, then, remote data are to be loaded, and the system recognizes the request as being for remote data access as a result of the comparison.

Thus, the comparator 320 outputs a logic 0 to the address merge circuit 370 via the local-remote decision signal line 540, and at the same time activates the remote memory access circuit 400. The load request is also input by the address merge circuit 370 and the remote memory access circuit 390 via the address signal line 510.

In the address merge circuit 370, the logic 0 bit output on line 540 is embedded at bit position 20 in the merged address 572. The merged address is output on line 570 to the cache controller 340, which places the merged address 572 onto the cache control signal line 550 to the address array 350.

Because the embedded bit is a logic 0, the addressed range is 00000-7FFFF in hexadecimal, defining the address range corresponding to the memory locations in remote data area 70. In other words, the lower-order 512 kilobytes of the 1-megabyte direct map cache memory are assigned to the remote data area 70, as previously mentioned.

Since in this example, the requested data are not registered in the remote data area 70, the cache memory controller 340 is notified via the cache memory control signal line 550, and outputs a load request for memory to the remote memory access circuit 400 via the memory access request signal line 560. The local memory access 390 also receives the request, but since only the remote memory access circuit 400 is activated by the local-remote decision bit on line 540, no action is taken by the local memory access circuit 390.

Instead, the remote memory access circuit 400 outputs the load request address presented on the address signal line 510 to the remote access request circuit 80. See FIG. 1. Then, the remote access request circuit 80 generates a remote load request message. It further derives a node number from the load request address by using a method similar to that shown in FIG. 4, and sends the remote load request message to a remote access reply circuit of the node having the derived node number via the network 200.

The remote access reply circuit (such as circuit 190 in node 110) loads the data from the shared memory of the remote node, generates a remote load reply message and returns the message to the remote access request circuit 80 through the network 200.

Back at the requesting node 10, the remote access request circuit 80 receives the reply message, derives the reply data corresponding to the load request, and returns the reply data to the remote memory access circuit 400. The reply data are transferred to the processor 20 through the data line 520, and the cache memory controller 340 outputs a reply data registration request to the address array 350 via the cache memory control signal line 550.

Upon receiving the registration request, the address array 350 erases part of the data in the remote data area 70, newly registers the reply data obtained from the data line 530 in the remote data area 70, and updates the address array 350. In this way, the loading of remote data not registered in the remote data area 70 does not affect the local data area 40.
(3-2)

In this example, the remote data to be loaded are registered in the remote data area 70 in the local-remote divided cache memory 30.

When a load request is output from the processor 20 to the local-remote divided cache memory subsystem 30 shown in FIG. 2A, the local-remote divided cache memory subsystem 30 checks the load request address to determine whether the request is for local data or remote data. This decision is made in the same manner as for example (3-1) above.

When the comparator 320 outputs a logic 0 to the address merge circuit 370 via the local-remote decision signal line 540 (indicating that the request concerns remote data), it also activates the remote memory access circuit 400. As before, the load request is also input by the address merge circuit 370 and the remote memory access circuit 400 via the address signal line 510.

In the address merge circuit 370, the logic 0 bit output on line 540 is again embedded at bit position 20 in the merged address 572. The merged address is output on line 570 to the cache controller 340, which places the merged address 572 onto the cache control signal line 550 to the address array 350. Because the embedded bit is a logic 0, the address is defined in the address range corresponding to the memory locations in remote data area 70. Thus, the cache memory controller 340 searches through the address array 350 corresponding to those memory locations.

Since in this example, the requested data are registered in the remote data area 70, the cache memory controller 340 is notified via the cache memory control signal line 550, and the registered data are transferred to the processor 20 through the data lines 530, 520. In this way, the loading of the remote data registered in the remote data area 70 does not affect the local data area 40.

EXAMPLE 4

For the system embodiments shown in FIGS. 1 and 2A, when the processor 20 stores remote data present in another node, the following cases are considered.
(4-1)

In this example, the remote data to be stored are not registered in the remote data area 70 in the local-remote divided cache memory 30.

When a store request is output from the processor 20 to the local-remote divided cache memory subsystem 30 shown in FIG. 2A, the local-remote divided cache memory subsystem 30 checks the store request address to determine whether the request concerns local data or remote data. As for example (3-1), this decision is made in accordance with the operations of the mask 310, comparator 320, and node number register 330.

When the comparator 320 outputs a logic 0 to the address merge circuit 370 via the local-remote decision signal line 540, it also activates the remote memory access circuit 400. The store request is also input by the address merge circuit 370 and the remote memory access circuit 400 via the address signal line 510.

The merged address 572 is formed as described above, and is output on line 570 to the cache controller 340, which places the merged address 572 onto the cache control signal line 550 to the address array 350. Because the embedded bit is a logic 0, the address is defined in the address range corresponding to the memory locations in remote data area 70. Thus, the cache memory controller 340 searches through the address array 350 corresponding to those memory locations.

Since in this example, the requested data are not registered in the remote data area 40, the cache memory controller 340 is notified via the cache memory control signal line 550, and outputs a store request for memory to the remote memory access circuit 400 via the memory access request signal line 560. The local memory access 390 also receives the request, but since only the remote memory access circuit 400 is activated by the local-remote decision bit on line 540, no action is taken by the local memory access circuit 390.

Instead, the remote memory access circuit 400 outputs the store request address presented on the address signal line 510, along with the data received on line 520, to the remote access request circuit 80. The remote access request circuit 80, in response to the request from the remote memory access circuit 400, generates a remote store request message that contains the store request address and data, and further derives a node number from the store request address by using a method similar to that shown in FIG. 4. Then, the remote access request circuit 80 sends the remote store request message to a remote access reply circuit (such as circuit 190) of the node having the node number via the network 200.

At the remote node, the remote access reply circuit stores the data into the shared memory of the remote node, generates a remote load reply message and returns the message to the remote access request circuit 80 through the network 200. In this way, the storing of remote data not registered in the remote data area 70 does not affect the local data area 40.
(4-2)

In this example, the remote data to be stored are registered in the remote data area 70 in the local-remote divided cache memory 30.

When a store request is output from the processor 20 to the local-remote divided cache memory subsystem 30 shown in FIG. 2A, the local-remote divided cache memory subsystem 30 checks the store request address to determine whether the request concerns local data or remote data. This decision is made in the same manner as for example (4-1) above.

When the comparator 320 outputs a logic 0 to the address merge circuit 370 via the local-remote decision signal line 540 (indicating that the request concerns remote data), it also activates the remote memory access circuit 400. As before, the store request is also input by the address merge circuit 370 and the remote memory access circuit 400 via the address signal line 510.

The merged address 572 is again formed in the address merge circuit 370 and output on line 570 to the cache controller 340, which places the merged address 572 onto the cache control signal line 550 to the address array 350. Because the embedded bit is a logic 0, the address is defined in the address range corresponding to the memory locations in remote data area 70. Thus, the cache memory controller 340 searches through the address array 350 corresponding to those memory locations.

Since in this example, the requested data are registered in the remote data area 70, the cache memory controller 340 is notified via the cache memory control signal line 550. The cache memory controller 340 then issues a request for eliminating registration of the store-requested data to the address array 350. In response to the request, the address array 350 deletes the registration information on the stored data from the local data area 40.

Further, the cache memory controller 340 sends a store request for memory to the local memory access circuit 390 and the remote memory access circuit 400 through the memory access request signal line 560. The local memory access circuit 390 is not activated, but the remote memory access circuit 400 outputs the store request address presented on the address signal line 510 and the store data presented on line 520 to the remote access request circuit 80. The remote access request circuit 80, in response to the request, generates a remote store request message that contains the store request address and the data. It further derives a node number from the store request address by using a method similar to that shown in FIG. 4, and sends the remote store request message to the remote access reply circuit of the remote node having the derived node number. The remote access reply circuit then outputs the received address and data to its shared memory, which is updated according to the request. In this way, the storing of the remote data registered in the remote data area 70 does not affect the local data area 40.

EXAMPLE 5

For the system embodiments shown in FIGS. 5–8, when the processor 25 loads local data present in its node 15, the following cases are considered.

(5-1)

In this example, the local data to be loaded are not registered in the local data cache 45.

When a load request is output from the processor 25 to the access discriminate circuit 35 shown in FIG. 6, the access discriminate circuit 35 checks the load request address to determine whether the request is for local data or remote data. As for Example 1, this decision is made in accordance with the operations of the mask 310, comparator 320, and node number register 330.

With further reference to FIG. 4, the load request address 610 and the mask information 620 are logically ANDed to derive a node number 630 from the load request address 610. The node number 630 derived from the address is compared with the node number information 640 stored in the node number register 330, using the comparator 320. In this example, local data are to be loaded, so the two node numbers agree, and the system recognizes the request as being for local data access.

Thus, the comparator 325 activates the latch 395 through the local-remote decision signal line 545. As a result, the load request is output to the local data cache 45 shown in FIG. 7, and enters the cache memory controller 343 through the address signal line 513. The cache memory controller 343 then outputs the load request address to the address array 353 through the cache memory control signal line 553.

The address array 353 that stores the addresses of information registered in the cache memory 363 checks whether the data, which are load-requested from the cache memory controller 343, are registered in the cache memory 363, and gives information representing the absence of registration to the cache memory controller e343 through the cache memory control signal line 553.

Upon receiving the information, the cache memory controller 343 issues a load request for memory to the memory access circuit 393 through a memory access request signal line 563. The memory access circuit 393 outputs the load request address presented on the address signal line 513 to the shared memory 65 through the selector 55. The shared memory 65 returns reply data for the load request to the memory access circuit 393.

The reply data are then sent via the data line 523 to the processor 25. At the same time, the cache memory controller 343 outputs a reply data registration request to the address array 353 through the cache memory control signal line 553. Upon receiving the registration request, the address array 353 erases part of the data in the cache memory 363, newly registers the reply data obtained through the data line 533 in the cache memory 363, and updates the information in the address array 353. In this way, the loading of local data not registered in the local data cache 45 does not affect the remote data cache 75.

(5-2)

In this example, the local data to be loaded are registered in the local data cache 45.

When a load request is output from the processor 25 to the access discriminate circuit 35 shown in FIG. 6, the access discriminate circuit 35 checks the load request address to determine whether the request is for local data or remote data. This decision is made in the same manner as for Example (5-1).

When the comparator 325 determines that the request concerns local data, it activates the latch 395 through the local-remote decision signal line 545. As a result, the load request is output to the local data cache 45 shown in FIG. 7, and enters the cache memory controller 343 through the address signal line 513. The cache memory controller 343 then outputs the load request address to the address array 353 through the cache memory control signal line 553.

The address array 353 that stores the addresses of information registered in the cache memory 363 checks whether the data, which are load-requested from the cache memory controller 343, are registered in the cache memory 363, and gives information representing the presence of registration to the cache memory controller 343 through the cache memory control signal line 553. At the same time, the registered data are placed on the data lines 533, 523. In this way, the loading of local data registered in the local data cache 45 does not affect the remote data cache 75.

EXAMPLE 6

When the processor 25 stores local data present in its node 15, the following cases are considered.

(6-1)

In this example, the local data to be stored are not registered in the local data cache 45.

When a store request is output from the processor 25 to the access discriminate circuit 35 shown in FIG. 6, the access discriminate circuit 35 checks the store request address to determine whether the request is for local data or remote data. This decision is made in the same manner as for Example (5-1).

When the comparator 325 decides that the request pertains to local data, it activates the latch 395 through the local-remote decision signal line 545. As a result, the store request is output to the local data cache 45 shown in FIG. 7, and enters the cache memory controller 343 through the address signal line 513. The cache memory controller 343 then outputs the store request address to the address array 353 through the cache memory control signal line 553.

The address array 353 that stores the addresses of information registered in the cache memory 363 checks whether the data, which are store-requested from the cache memory controller 343, are registered in the cache memory 363, and gives information representing the absence of registration to the cache memory controller 343 through the cache memory control signal line 553.

Upon receiving the information, the cache memory controller 343 issues a store request for memory to the memory access circuit 393 through a memory access request signal line 563. The memory access circuit 393 outputs the store request address presented on the address signal line 513 and the store data on the data signal line 523 to the shared memory 65 through the selector 55. The shared memory 65 updates data according to the request. In this way, the storing of local data not registered in the local data cache 45 does not affect the remote data cache 75.

(6-2)

In this example, the local data to be stored are registered in the local data cache 45.

When a store request is output from the processor 25 to the access discriminate circuit 35 shown in FIG. 6, the access discriminate circuit 35 checks the store request address to determine whether the request is for local data or remote data. This decision is made in the same manner as for Example (5-1).

When the comparator 325 determines that the request concerns local data, it activates the latch 395 through the local-remote decision signal line 545. As a result, the store request is output to the local data cache 45 shown in FIG. 7, and enters the cache memory controller 343 through the address signal line 513. The cache memory controller 343 then outputs the store request address to the address array 353 through the cache memory control signal line 553.

The address array 353 that stores the addresses of information registered in the cache memory 363 checks whether the data, which are store-requested from the cache memory controller 343, are registered in the cache memory 363, and gives information representing the presence of registration to the cache memory controller 343 through the cache memory control signal line 553.

Upon receiving the registration presence information, the cache memory controller 343 issues a request for eliminating the registration of the store-requested data to the address array 353. The address array 353, in response to the registration cancel request, erases the registration information concerned from the cache memory 363 and updates the information in the address array 353.

Further, the cache memory controller 343 outputs a store request for memory to the memory access circuit 393 through the memory access request signal line 563. The memory access circuit 393 sends the store request address presented on the address signal line 513 and the store data on the data signal line 523 to the shared memory 65 through the selector 55. The shared memory 65 updates the data according to the request. In this way, the storing of local data registered in the local data cache 45 does not affect the remote data cache 75.

EXAMPLE 7

When the processor 25 loads remote data present in another node such as node 115, the following cases are considered.

(7-1)

In this example, the local data to be loaded are not registered in the remote data cache 45.

When a load request is output from the processor 25 to the access discriminate circuit 35 shown in FIG. 6, the access discriminate circuit 35 checks the load request address to determine whether the request is for local data or remote data. The procedure is the same as that for Example (5-1).

When the comparator 325 has determined that the request concerns remote data, it activates the latch 405 through the local-remote decision signal line 545. As a result, the load request is output to the remote data cache 75 shown in FIG. 8.

The load request that was output to the remote data cache 75 is entered into a cache memory controller 346 through an address signal line 516. The cache memory controller 346 puts out the load request address to the address array 356 through the cache memory control signal line 556.

The address array 356 that stores the addresses of information registered in the cache memory 366 checks whether the data, which are load-requested from the cache memory controller 346, are registered in the cache memory 366, and gives information representing the absence of registration to the cache memory controller 346 through the cache memory control signal line 556.

Upon receiving the information, the cache memory controller 346 issues a load request for memory to the memory access circuit 396 through a memory access request signal line 566. The memory access circuit 396 outputs the load request address presented on the address signal line 516 to the remote access request circuit 85.

The remote access request circuit 85 generates a remote load request message according to the request from the memory access circuit 296. Further, by using the method similar to the one shown in FIG. 4, the remote access request circuit 85 derives a node number from the load request address and passes the remote load request message to a remote access reply circuit 195 of the node having the node number through the network 205.

The remote access reply circuit 195 that has received the remote load request message loads the data from the shared memory 165, generates a remote load reply message containing the load data, and returns it to the remote access request circuit 85 through the network 205. The remote access request circuit 85 then forwards the reply data to the memory access circuit 396.

The memory access circuit 396 then sends the reply data to the processor 25 through the data line 526. At the same time, the cache memory controller 346 issues a request for registering the reply data to the address array 356 through the cache memory control signal line 556. In response to the request, the address array 356 erases part of the data in the cache memory 366, newly registers the reply data in the cache memory 366, and updates the address array 356.

In this way, the loading of remote data not registered in the remote data cache 75 does not affect the local data area 40.

(7-2)

In this example, the remote data to be loaded are registered in the remote data cache 75.

When a load request is output from the processor 25 to the access discriminate circuit 35 shown in FIG. 6, the access discriminate circuit 35 checks the load request address to determine whether the request is for local data or remote data. This decision is made in the same manner as for Example (5-1).

When the comparator 325 determines that the request concerns remote data, it activates the latch 405 through the local-remote decision signal line 545. As a result, the load request is output to the remote data cache 75 shown in FIG. 8.

The load request that was output to the remote data cache 75 is entered into a cache memory controller 346 through an address signal line 516. The cache memory controller 346 outputs the load request address to an address array 356 through a cache memory control signal line 556.

The address array 356 that stores the addresses of information registered in the cache memory 366 checks whether the data, which are load-requested from the cache memory controller 346, are registered in the cache memory 366, and gives information representing the presence of registration to the cache memory controller 346 through the cache memory control signal line 556. At the same time, the registered data are placed on the data lines 536, 526. In this way, the loading of remote data registered in the remote data cache 75 does not affect the local data cache 45.

EXAMPLE 8

When the processor 25 stores remote data present in its node 15, the following cases are considered.

(8-1)

In this example, the remote data to be stored are not registered in the remote data cache 75.

When a store request is output from the processor 25 to the access discriminate circuit 35 shown in FIG. 6, the access discriminate circuit 35 checks the store request address to determine whether the request is for local data or remote data. This decision is made in the same manner as for Example (5-1).

When the comparator 325 decides that the request pertains to remote data, it activates the latch 405 through the local-remote decision signal line 545. As a result, the store request is output to the remote data cache 75 shown in FIG. 8.

The store request that was output to the remote data cache 75 is entered into a cache memory controller 346 through an address signal line 516. The cache memory controller 346 outputs the store request address to an address array 356 through a cache memory control signal line 556.

The address array 356 that stores the addresses of information registered in the cache memory 366 checks whether the data, which are store-requested from the cache memory controller 346, are registered in the cache memory 366, and gives information representing the absence of registration to the cache memory controller 346 through the cache memory control signal line 556.

Upon receiving the information, the cache memory controller 346 issues a store request for memory to the memory access circuit 396 through a memory access request signal line 566. The memory access circuit 396 outputs the store request address presented on the address signal line 516 and the store data on the data signal line 526 to the remote access request circuit 85.

The remote access request circuit 85 generates a remote store request message containing the store request address and data according to the request from the memory access circuit 396. Further, by using a method similar to that shown in FIG. 4, the remote access request circuit 85 derives a node number from the store request address and passes the remote store request message to the remote access reply circuit 195 of the derived node number through the network 205.

The remote access reply circuit 195 that has received the remote store request message forwards the remote store address and data from the message and outputs them to the shared memory 165. The shared memory 165 updates data according to the request. In this way, the storing of remote data not registered in the remote data cache 75 does not affect the local data cache 45.

(8-2)

In this example, the remote data to be stored are registered in the remote data cache 75.

When a store request is output from the processor 25 to the access discriminate circuit 35 shown in FIG. 6, the access discriminate circuit 35 checks the store request address to determine whether the request is for local data or remote data. This decision is made in the same manner as for Example (5-1).

When the comparator 325 determines that the request concerns remote data, it activates the latch 405 through the local-remote decision signal line 545. As a result, the store request is output to the remote data cache 75 shown in FIG. 8.

The store request that was output to the remote data cache 75 is entered into a cache memory controller 346 through an address signal line 516. The cache memory controller 346 outputs the store request address to an address array 356 through a cache memory control signal line 556.

The address array 356 that stores the addresses of information registered in the cache memory 366 checks whether the data, which are store-requested from the cache memory controller 346, are registered in the cache memory 366, and gives information representing the presence of registration to the cache memory controller 346 through the cache memory control signal line 556.

Upon receiving the registration presence information, the cache memory controller 346 issues a request for eliminating the registration of the store-requested data to the address array 356. The address array 356, in response to the registration cancel request, erases the registration information concerned from the cache memory 366 and updates the information in the address array 356.

Further, the cache memory controller 346 outputs a store request for memory to the memory access circuit 396 through the memory access request signal line 566. The memory access circuit 396 sends the store request address presented on the address signal line 516 and the store data on the data signal line 526 to the remote access request circuit 85.

The remote access request circuit 85 generates a remote store request message containing the store request address and data according to the request from the memory access circuit 396. Further, by using a method similar to that shown in FIG. 4, the remote access request circuit 85 derives a node number from the store request address and passes the remote store request message to the remote access reply circuit 195 of the derived node number through the network 205.

The remote access reply circuit 195 that has received the remote store request message forwards the remote store address and data from the message and outputs them to the shared memory 165. The shared memory 165 updates data according to the request. In this way, the storing of remote data registered in the remote data cache 75 does not affect the local data cache 45.

EXAMPLE 9

For the system embodiments shown in FIGS. 9–11, Examples 5–8 are representative. The primary differences between the embodiments stem from the restructuring of the access discriminate circuit and the local and remote caches, so that the latter embodiment can take advantage of the ability to use market processors having a single data pin. Functionally, the embodiments are the same, and thus specific examples for FIGS. 9–11 along the above lines would be substantially redundant.

Various modifications of the invention will become apparent to those of ordinary skill in the art. All such modifications that basically rely upon the teachings through which the invention has advanced the state of the art are properly considered within the spirit and scope of the invention.

We claim:

1. A parallel processor network system, comprising:

a plurality of nodes each including a processor, a distributed shared memory accessible by any of the processors, and a cache memory subsystem, each cache memory subsystem including a cache memory divided address-wise into respective local and remote data areas for holding local and remote data to be stored in one of the shared memories, respectively;

wherein each of the cache systems further includes means for determining whether an access request transmitted by one of the processors is intended for a local node or for a remote node, and means for addressably accessing either the local data area or the remote data area depending upon whether the access request is intended for a local node or a remote node, respectively, wherein an access request for accessing a remote node only affects the remote data in the remote data area without affecting the local data in the local data area.

2. A parallel processor network system according to claim 1, wherein the access request contains a header designating the local data area or the remote data area of one of the nodes.

3. A parallel processor network system according to claim 1, wherein each cache memory subsystem further includes a cache memory controller and an address array connected thereto for selectively addressing a local data area or remote data area based upon the access request.

4. A parallel processor network system according to claim 1, wherein each cache memory subsystem includes an addressable access discriminating circuit for selecting a local data area or a remote data area based upon the access request.

5. A parallel processor network system, comprising:

a plurality of nodes each including a processor, a shared memory accessible by any of the processors, and a cache system including independently addressable local and remote data caches for respectively holding local and remote data to be stored in one of the shared memories;

wherein each cache system further includes means for determining whether an access request transmitted by one of the processors is intended for a local node or for a remote node, and means for addressably accessing either the local data area or the remote data area depending upon whether the access request is intended for a local node or a remote node, respectively, wherein an access request for accessing a remote node only affects the remote data in the remote data area without affecting the local data in the local data area.

6. A parallel processor network system according to claim 5, wherein the access request contains a header designating the local data area or the remote data area of one of the nodes.

7. A parallel processor network system according to claim 5, wherein each cache system further includes a cache memory controller and an address array connected thereto for selectively addressing a local data area or remote data area based upon the access request.

8. A parallel processor network system according to claim 5, wherein each cache system includes an addressable access discriminating circuit for addressably selecting a local data area or a remote data area based upon the access request.

9. A processor element for use in a parallel processor network system, comprising:

a processor;

a local-remote divided cache memory subsystem, including means for receiving a data transfer request from the processor, means for determining whether the data transfer request concerns local data or remote data, a local data area for holding local data, a remote data area for holding remote data, and means for addressably accessing the local data area or the remote data area from information contained in the data transfer request;

a remote access request circuit for transmitting an access request to an accessed remote processor element responsive to a signal received from the local-remote divided cache memory subsystem, and for receiving data from the accessed remote processor element as a result of the transmitted access request;

a remote access reply circuit for receiving an access request from a requesting remote processor element, and for transferring data to the requesting remote processor element as a result of the received access request;

a shared memory accessible by said local-remote divided cache memory subsystem and by said remote access reply circuit; and a selector for selectively providing access to the shared memory to one of the local-remote divided cache memory subsystem and the remote access reply circuit;

wherein a data transfer request for remote data only affects the remote data in the remote data area without affecting the local data in the local data area.

10. A processor element as claimed in claim 9, wherein the means for addressably accessing the local data area or remote data area includes a cache memory controller and an address array, the address array accessing the local data area or remote data area in response to a cache control signal received from the cache memory controller; and wherein the local-remote divided cache memory subsystem further includes a local memory access circuit for receiving a shared memory access request signal from the cache memory controller and for accessing the shared memory via the selector in response to the shared memory access request signal, and a remote memory access circuit for receiving a remote memory access request signal from the cache memory controller and for transmitting the access request to the remote processor element in response to the remote memory access request signal.

11. A processor element as claimed in claim 10, wherein the means for determining whether the data transfer request concerns local data or remote data includes a mask for receiving an address from the data transfer request received from the processor and for logically processing part of the address to output a mask information signal, a processor element number register for holding a processor element number received from the processor that indicates the processor element to which data are to be transferred to or from, and a comparator for receiving the processor element number from the processor element number register and the masked information and for outputting a local-remote decision signal indicating whether the request concerns local data or remote data; and wherein the local-remote divided cache memory subsystem further includes an address merge circuit for receiving the local-remote decision signal and the address, and for outputting a merged address to the cache memory controller, said merged address being employed by the cache memory controller to addressably access the local data area or the remote data area.

12. A processor element as claimed in claim 11, wherein the local-remote decision signal is a single binary bit, and wherein the address merge circuit embeds the local-remote decision bit at a predefined bit location in the address to create the merged address, said bit location dividing the bits of the address into higher-order and lower-order bits, the local-remote decision bit and the lower-order bits together defining a local data area address, and the higher-order bits defining a remote data area address.

13. A processor element as claimed in claim 9, wherein the means for determining whether the data transfer request concerns local data or remote data includes a mask for receiving an address from the data transfer request received from the processor and for logically processing part of the address to produce and output a mask information signal, a processor element number register for holding a processor element number received from the processor that indicates the processor element to which data are to be transferred to or from, and a comparator for receiving the processor element number from the processor element number register and the masked information and for outputting a local-remote decision signal indicating whether the request concerns local data or remote data.

14. A processor element as claimed in claim 13, wherein the part of the address logically processed by the mask to produce the mask information signal is the processor element number held by the processor element number register.

15. A parallel processor network system, comprising:

a plurality of processor elements mutually connected by a network, each processor element having:

a processor;

a local-remote divided cache memory subsystem, including means for receiving a data transfer request from the processor, means for determining whether the data transfer request concerns local data or remote data, a local data area for holding local data, a remote data area for holding remote data, and means for addressably accessing the local data area or the remote data area from information contained in the data transfer request;

a remote access request circuit for transmitting an access request to an accessed remote processor element responsive to a signal received from the local-remote divided cache memory subsystem, and for receiving data from the accessed remote processor element as a result of the transmitted access request;

a remote access reply circuit for receiving an access request from a requesting remote processor element, and for transferring data to the requesting remote processor element as a result of the received access request;

a shared memory accessible by said local-remote divided cache memory subsystem and by said remote access reply circuit; and a selector for selectively providing access to the shared memory to one of the local-remote divided cache memory subsystem and the remote access reply circuit;

wherein a data transfer request for remote data only affects the remote data in the remote data area without affecting the local data in the local data area.

16. A parallel processor network system as claimed in claim 15, wherein the means for addressably accessing the local data area or remote data area includes a cache memory controller and an address array, the address array accessing the local data area or remote data area in response to a cache control signal received from the cache memory controller; and wherein the local-remote divided cache memory subsystem further includes a local memory access circuit for receiving a shared memory access request signal from the cache memory controller and for accessing the shared memory via the selector in response to the shared memory access request signal, and a remote memory access circuit for receiving a remote memory access request signal from the cache memory controller and for transmitting the access request to the remote processor element in response to the remote memory access request signal.

17. A parallel processor network system as claimed in claim 16, wherein the means for determining whether the data transfer request concerns local data or remote data includes a mask for receiving an address from the data transfer request received from the processor and for logically processing part of the address to output a mask information signal, a processor element number register for holding a processor element number received from the processor that indicates the processor element to which data are to be transferred to or from, and a comparator for receiving the processor element number from the processor element number register and the masked information and for outputting a local-remote decision signal indicating whether the request concerns local data or remote data; and wherein the local-remote divided cache memory subsystem further includes an address merge circuit for receiving the local-remote decision signal and the address, and for outputting a merged address to the cache memory controller, said merged address being employed by the cache memory controller to addressably access the local data area or the remote data area.

18. A parallel processor network system as claimed in claim 17, wherein the local-remote decision signal is a single binary bit, and wherein the address merge circuit embeds the local-remote decision bit at a predefined bit location in the address to create the merged address, said bit location dividing the bits of the address into higher-order and lower-order bits, the local-remote decision bit and the lower-order bits together defining a local data area address, and the higher-order bits defining a remote data area address.

19. A parallel processor network system as claimed in claim 15, wherein the means for determining whether the data transfer request concerns local data or remote data includes a mask for receiving an address from the data transfer request received from the processor and for logically processing part of the address to produce and output a mask information signal, a processor element number register for holding a processor element number received from the processor that indicates the processor element to which data are to be transferred to or from, and a comparator for receiving the processor element number from the processor element number register and the masked information and for outputting a local-remote decision signal indicating whether the request concerns local data or remote data.

20. A parallel processor network system as claimed in claim 19, wherein the part of the address logically processed by the mask to produce the mask information signal is the processor element number held by the processor element number register.

21. A processor element for use in a parallel processor network system, comprising:

a processor;

address discriminating means for receiving a data transfer request from the processor, and for outputting a selection signal indicating whether the data transfer request concerns local data of the processor element or remote data of a remote processor element of the network system;

a local data cache subsystem for holding local data;

a remote data cache subsystem for holding remote data; and selecting means for selecting one of the local data cache subsystem and the remote data cache subsystem responsive to the selection signal;

wherein when said selecting means selects the remote data cache subsystem, only the remote data are affected without affecting the local data in the local data cache subsystem.

22. A processor element as claimed in claim 21, further comprising:

a remote access request circuit for transmitting an access request to an accessed remote processor element responsive to a signal received from the remote data cache subsystem, and for receiving data from the accessed remote processor element as a result of the transmitted access request;

a remote access reply circuit for receiving an access request from a requesting remote processor element, and for transferring data to the requesting remote processor element as a result of the received access request;

a shared memory accessible by said local data cache subsystem and by said remote access reply circuit; and a selector for selectively providing access to the shared memory to one of the local data cache subsystem and the remote access reply circuit.

23. A processor element as claimed in claim 21, wherein the address discriminating means includes a mask for receiving an address from the data transfer request received from the processor and for logically processing part of the address to produce and output a mask information signal, a processor element number register for holding a processor element number received from the processor that indicates the processor element to which data are to be transferred to or from, and a comparator for receiving the processor element number from the processor element number register and the masked information and for outputting the selection signal.

24. A processor element as claimed in claim 23, wherein the address discriminating circuit further includes:

a local latch, activated by the selection signal when the selection signal indicates that the data transfer request concerns local data, for accessing the local data cache subsystem; and a remote latch, activated by the selection signal when the selection signal indicates that the data transfer request concerns remote data, for accessing the remote data cache subsystem.

25. A processor element as claimed in claim 21, wherein the local data cache subsystem includes a cache memory controller, an address array for accessing the local data area in response to a cache control signal received from the cache memory controller, and a local memory access circuit for receiving a memory access request signal from the cache memory controller and for accessing the shared memory in response thereto; and wherein the remote data cache subsystem includes a cache memory controller, an address array for accessing the remote data area in response to a cache control signal received from the cache memory controller, and a remote memory access circuit for receiving a remote memory access request signal from the cache memory controller and for transmitting the access request to the remote processor element in response thereto.

26. A processor element for use in a parallel processor network system, comprising:

a processor;

a local data cache subsystem, including a local cache memory for holding local data, and first address discriminating means for receiving a data transfer request from the processor and for addressing the local cache memory when the data transfer request concerns local data of the processor element; and a remote data cache subsystem, including a remote cache memory for holding remote data, and second address discriminating means for receiving a data transfer request from the processor and for addressing the remote cache memory when the data transfer request concerns remote data of a remote processor element of the network system;

wherein, when the data transfer request concerns the remote data, only the remote data are affected without affecting the local data in the local cache memory.

27. A processor element as claimed in claim 26, further comprising:

a remote access request circuit for transmitting an access request to an accessed remote processor element responsive to a signal received from the remote data cache subsystem, and for receiving data from the accessed remote processor element as a result of the transmitted access request;

a remote access reply circuit for receiving an access request from a requesting remote processor element, and for transferring data to the requesting remote processor element as a result of the received access request;

a shared memory accessible by said local data cache subsystem and by said remote access reply circuit; and a selector for selectively providing access to the shared memory to one of the local data cache subsystem and the remote access reply circuit.

28. A processor element as claimed in claim 26, wherein each of the first and second address discriminating means includes a mask for receiving an address from the data transfer request received from the processor and for logically processing part of the address to produce and output a mask information signal, a processor element number register for holding a processor element number received from the processor that indicates the processor element to which data are to be transferred to or from, and a comparator for receiving the processor element number from the processor element number register and the masked information and for outputting a signal for addressing the respective cache memory.

29. A processor element as claimed in claim 26, wherein the first address discriminating means includes a first latch for receiving the data transfer request and for providing a signal for accessing the local cache memory; and wherein the second address discriminating means includes a second latch for receiving the data transfer request and for providing a signal for accessing the remote cache memory.

30. A processor element as claimed in claim 29, wherein the local data cache subsystem includes a cache memory controller, an address array for accessing the local cache memory in response to a cache control signal received from the cache memory controller, and a local memory access circuit for receiving a memory access request signal from the cache memory controller and for accessing the shared memory in response thereto; and wherein the remote data cache subsystem includes a cache memory controller, an address array for accessing the remote cache memory in response to a cache control signal received from the cache memory controller, and a remote memory access circuit for receiving a remote memory access request signal from the cache memory controller and for transmitting the access request to the remote processor element in response thereto.

31. A parallel processor network system, comprising:

a plurality of processor elements mutually connected by a network, each processor element having:

a processor;

address discriminating means for receiving a data transfer request from the processor, and for outputting a selection signal indicating whether the data transfer request concerns local data of the processor element or remote data of a remote processor element of the network system;

a local data cache subsystem for holding local data;

a remote data cache subsystem for holding remote data; and selecting means for selecting one of the local data cache subsystem and the remote data cache subsystem responsive to the selection signal;

wherein, when said selecting means selects the remote data cache subsystem, only the remote data are affected without affecting the local data in the local data cache subsystem.

32. A parallel processor network system as claimed in claim 31, each said processor element further comprising:

a remote access request circuit for transmitting an access request to an accessed remote processor element responsive to a signal received from the remote data cache subsystem, and for receiving data from the accessed remote processor element as a result of the transmitted access request;

a remote access reply circuit for receiving an access request from a requesting remote processor element, and for transferring data to the requesting remote processor element as a result of the received access request;

a shared memory accessible by said local data cache subsystem and by said remote access reply circuit; and a selector for selectively providing access to the shared memory to one of the local data cache subsystem and the remote access reply circuit.

33. A parallel processor network system as claimed in claim 31, wherein the address discriminating means includes a mask for receiving an address from the processor and for logically processing part of the address to produce and output a mask information signal, a processor element number register for holding a processor element number received from the processor that indicates the processor element to which data are to be transferred to or from, and a comparator for receiving the processor element number from the processor element number register and the masked information and for outputting the selection signal.

34. A parallel processor network system as claimed in claim 33, wherein the address discriminating circuit further includes:

a local latch, activated by the selection signal when the selection signal indicates that the data transfer request concerns local data, for accessing the local data cache subsystem; and a remote latch, activated by the selection signal when the selection signal indicates that the data transfer request concerns remote data, for accessing the remote data cache subsystem.

35. A parallel processor network system as claimed in claim 31, wherein the local data cache subsystem includes a cache memory controller, an address array for accessing the local data area in response to a cache control signal received from the cache memory controller, and a local memory access circuit for receiving a memory access request signal from the cache memory controller and for accessing the shared memory in response thereto; and wherein the remote data cache subsystem includes a cache memory controller, an address array for accessing the remote data area in response to a cache control signal received from the cache memory controller, and a remote memory access circuit for receiving a remote memory access request signal from the cache memory controller and for transmitting the access request to the remote processor element in response thereto.

36. A parallel processor network system, comprising:

a plurality of processor elements mutually connected by a network, each processor element having:

a processor;

a local data cache subsystem, including a local cache memory for holding local data, and first address discriminating means for receiving a data transfer request from the processor and for addressing the local cache memory when the data transfer request concerns local data of the processor element; and a remote data cache subsystem, including a remote cache memory for holding remote data, and second address discriminating means for receiving a data transfer request from the processor and for addressing the remote cache memory when the data transfer request concerns remote data of a remote processor element of the network system;

wherein, when the data transfer request concerns the remote data, only the remote data are affected without affecting the local data in the local cache memory.

37. A parallel processor network system as claimed in claim 36, each processor element further comprising:

a remote access request circuit for transmitting an access request to an accessed remote processor element responsive to a signal received from the remote data cache subsystem, and for receiving data from the accessed remote processor element as a result of the transmitted access request;

a remote access reply circuit for receiving an access request from a requesting remote processor element, and for transferring data to the requesting remote processor element as a result of the received access request;

a shared memory accessible by said local data cache subsystem and by said remote access reply circuit; and a selector for selectively providing access to the shared memory to one of the local data cache subsystem and the remote access reply circuit.

38. A parallel processor network system as claimed in claim 36, wherein each of the first and second address discriminating means includes a mask for receiving an address from the data transfer request received from the processor and for logically processing part of the address to produce and output a mask information signal, a processor element number register for holding a processor element number received from the processor that indicates the processor element to which data are to be transferred to or from, and a comparator for receiving the processor element number from the processor element number register and the masked information and for outputting a signal for addressing the respective cache memory.

39. A parallel processor network system as claimed in claim 36, wherein the first address discriminating means includes a first latch for receiving the data transfer request and for providing a signal for accessing the local cache memory; and wherein the second address discriminating means includes a second latch for receiving the data transfer request and for providing a signal for accessing the remote cache memory.

40. A parallel processor network system as claimed in claim 39, wherein the local data cache subsystem includes a cache memory controller, an address array for accessing the local cache memory in response to a cache control signal received from the cache memory controller, and a local memory access circuit for receiving a memory access request signal from the cache memory controller and for accessing the shared memory in response thereto; and wherein the remote data cache subsystem includes a cache memory controller, an address array for accessing the remote cache memory in response to a cache control signal received from the cache memory controller, and a remote memory access circuit for receiving a remote memory access request signal from the cache memory controller and for transmitting the access request to the remote processor element in response thereto.

* * * * *

UNITED STATES PATENT AND TRADEMARK OFFICE
CERTIFICATE OF CORRECTION

PATENT NO.  : 5,778,429
DATED       : July 7, 1998
INVENTOR(S) : N. Sukegawa et al It is certified that error appears in the above-indentified patent and that said Letters Patent is hereby corrected as shown below:

IN THE CLAIMS:

Column 21, claim 11, line 1, after "a" insert --local--;
lines 2 and 3, delete the lines in their entirety; and
line 4, after "the" insert --local--.

Claim 12, line 22, change "address, and the higher-order bits" to --.--; and
line 23, delete the line in its entirety.

Claim 13, line 30, after "a" insert --local--;
line 31, delete "received from the processor that indicates";
line 32, delete the line in its entirety; and
line 33, delete "or from", and after "the" insert --local--.

Claim 14, line 39, after "the" (second occurrence) insert --local--.

Column 22, claim 17, line 36, after "a" insert --local--;
lines 37 and 38, delete the lines in their entirety; and
line 40, after "the" insert --local--.

Claim 18, line 58, change "address, and the" to --.--; and
line 60, delete the line in its entirety.

Claim 19, line 67, after "a" insert --local--, and delete "received from";
Column 23, claim 19, line 1, delete the line in its entirety;
line 2, delete "data are to be transferred to or from"; and
line 3, after "the" (first occurrence) insert --local--.

Claim 20, line 10, before "processor" (first occurrence) insert --local--.

UNITED STATES PATENT AND TRADEMARK OFFICE
CERTIFICATE OF CORRECTION

PATENT NO. : 5,778,429
DATED : July 7, 1998
INVENTOR(S) : N. Sukegawa et al

It is certified that error appears in the above-indentified patent and that said Letters Patent is hereby corrected as shown below:

Claim 23, line 56, after "a" insert --local--;
lines 57 and 58, delete the lines in their entirety and replace with --number--; and
    line 59, after "the" insert --local--.

Column 24, claim 28, line 67, after "a" insert --local--, and delete "received from";
    Column 25, claim 28, line 1, delete the line in its entirety;
    line 2, delete "data are to transferred to or from"; and
    line 3, after "the" (first occurrence) insert --local--.

Column 26, claim 33, line 9, after "a" insert --local--;
lines 10 and 11, delete the lines in their entirety and replace with --, and--; and
    line 12, after "the" insert --local--.

UNITED STATES PATENT AND TRADEMARK OFFICE
CERTIFICATE OF CORRECTION

PATENT NO. : 5,778,429
DATED : July 7, 1998
INVENTOR(S) : N. Sukegawa et al

It is certified that error appears in the above-identified patent and that said Letters Patent is hereby corrected as shown below:

Column 27, claim 38, line 22, after "a" insert --local--;
lines 23 and 24, delete the lines in their entirety and replace with --number,--; and
    line 25, after "the" insert --local--.

Signed and Sealed this

Seventeenth Day of November, 1998

BRUCE LEHMAN

*Attest:*

*Attesting Officer*      *Commissioner of Patents and Trademarks*